(12) United States Patent
Larmuseau

(10) Patent No.: US 12,107,951 B2
(45) Date of Patent: *Oct. 1, 2024

(54) PROVENANCE VERIFICATION FOR SELECTIVE DISCLOSURE OF ATTRIBUTES

(71) Applicant: KONINKLIJKE PHILIPS N.V., Eindhoven (NL)

(72) Inventor: Adriaan Joris H. Larmuseau, Zwevegem (BE)

(73) Assignee: Koninklijke Philips N.V., Eindhoven (NL)

( * ) Notice: Subject to any disclaimer, the term of this patent is extended or adjusted under 35 U.S.C. 154(b) by 390 days.

This patent is subject to a terminal disclaimer.

(21) Appl. No.: 17/638,226

(22) PCT Filed: Sep. 2, 2020

(86) PCT No.: PCT/EP2020/074393
§ 371 (c)(1),
(2) Date: Feb. 25, 2022

(87) PCT Pub. No.: WO2021/043789
PCT Pub. Date: Mar. 11, 2021

(65) Prior Publication Data
US 2022/0329416 A1    Oct. 13, 2022

(30) Foreign Application Priority Data

Sep. 6, 2019    (WO) ................ PCT/CN2019/104740
Oct. 11, 2019   (EP) ..................................... 19202825

(51) Int. Cl.
*H04L 9/08*     (2006.01)
*H04L 9/32*     (2006.01)

(52) U.S. Cl.
CPC ............ *H04L 9/0825* (2013.01); *H04L 9/085* (2013.01); *H04L 9/3221* (2013.01); *H04L 9/3247* (2013.01)

(58) Field of Classification Search
None
See application file for complete search history.

(56) References Cited

U.S. PATENT DOCUMENTS 8,316,237  B1 * 11/2012  Felsher ................ H04L 63/061
                                                    380/282
2010/0034376 A1 *  2/2010  Okuizumi ........... G06F 21/6254
                                                    380/44

(Continued)

FOREIGN PATENT DOCUMENTS

GB    2462012 A       1/2010
JP    2002278449 A  * 9/2002

(Continued)

OTHER PUBLICATIONS

Camenisch et al "Signature schemes and anonymous credentials from bilinear maps", in Advances in Cryptology, vol. 3152 of LNCS, pp. 56-72, Springer Verlag, 2004.

(Continued)

*Primary Examiner* — Philip J Chea
*Assistant Examiner* — James Ross Hollister

(57) ABSTRACT

Some embodiments are directed to a system (100) for selectively disclosing attributes of a record. An issuer device (110) generates a digital signature on a message comprising the attributes and a secret record identifier. The record, secret record identifier, and signatures are provided to a selector device. The selector device (111) selectively discloses attributes of the record to a receiver device (112), proving authenticity by means of a zero-knowledge proof of knowledge of the signature on the attributes. The receiver device (112) verifies the proof with respect to the public key of the issuer and the received attributes.

16 Claims, 6 Drawing Sheets

(56) References Cited

U.S. PATENT DOCUMENTS

| | | | |
|---|---|---|---|
| 2011/0202764 A1* | 8/2011 | Furukawa | H04L 9/0844 |
| | | | 713/167 |
| 2012/0029938 A1 | 2/2012 | Lauter et al. | |
| 2012/0297198 A1 | 11/2012 | Danezis et al. | |
| 2012/0303616 A1 | 11/2012 | Abuelsaad et al. | |
| 2014/0189372 A1* | 7/2014 | Spalka | G06F 21/602 |
| | | | 713/193 |

FOREIGN PATENT DOCUMENTS

| | | | | |
|---|---|---|---|---|
| JP | 2003338816 A | * | 11/2003 | G06F 21/33 |
| WO | 2010086803 A | | 8/2010 | |
| WO | 2014075836 A1 | | 5/2014 | |

OTHER PUBLICATIONS

Camenisch et al "An Accumulator Based on Bilinear Maps and Efficient Revocation for Anonymous Credentials" Proceedings PKC '09.

"Message Authentication Code" from Wikipedia May 22, 2012.

Guan et al "Privacy Preserving and Efficient Aggregation Based on Blockchain for Power Grid Communications in Smart Communities" IEEE Communications Magazine, vol. 56, No. 7 Jul. 1, 2018 p. 82-88.

International Search Report and Written Opinion from PCT/EP2020/074393 mailed Oct. 1, 2020.

* cited by examiner

PROVENANCE VERIFICATION FOR SELECTIVE DISCLOSURE OF ATTRIBUTES

CROSS-REFERENCE TO PRIOR APPLICATIONS

This application is the U.S. National Phase application under 35 U.S.C. § 371 of International Application No. PCT/EP2020/074393, filed on Sep. 2, 2020, which claims the benefit of EP Patent Application No. EP 19202825.6, filed on Oct. 11, 2019 and International Application No. PCT/CN2019/104740, filed on Sep. 6, 2019. These applications are hereby incorporated by reference herein.

FIELD OF THE INVENTION

The invention relates to a system for selectively disclosing attributes of a record, e.g., medical attributes. The invention also relates to an issuer device, a selector device, and a receiver device for use in such a system. The invention further relates to an issuer method, a selector method, and a receiver method corresponding to the respective devices. The invention also relates to a computer readable storage medium.

BACKGROUND OF THE INVENTION

The use of medical data, such as genomic data, for medical research and treatment holds great promise in terms of possible applications, but if not dealt with carefully, also carries great risks in terms of data privacy and security. As medical data of more and more people is becoming available, the scope for doing medical research, e.g., to find better or more tailored treatment is increasing. At the same time, such medical research involves highly sensitive data, e.g., genotype and/or phenotype data. In many cases, for example, data about many different patients may be used. Hence, appropriate measures need to be taken to prevent unauthorized access and modification to such data.

A known way to limit data exposure in a medical research setting is de-identification. For example, in a known system, medical data may be collected from one or more originating parties, e.g., data from various devices or medical trials, and stored at a central platform. A researcher may request medical data of patients with certain characteristics. Following laws and global standards, such data should be de-identified. Accordingly, the platform may select data about one or more patients; de-identify the data, e.g., select a subset of the medical data, e.g., of the phenotype and genotype data; and provide the de-identified data to the researcher.

More generally, de-identification, e.g., providing a redacted version of a record of personal information which is sufficiently limited in its specificity and details so that it can no longer be linked to its data subject, is becoming more and more common, driven by legislative pushes such as the GDPR as well as medical standards such as GA4GH Beacon. For example, de-identified data may be used for medical research other than genomic research, but also in various other application areas such as financial services and advertising. For records more generally, e.g., not containing personal information, de-identification may be regarded as a type of selective disclosure, e.g., letting a data provider decide which parts of a record to share with a recipient.

From the point of view of the recipient of the de-identified data, e.g., the researcher receiving de-identified medical data about a patient, the fact that the data is de-identified may introduce risks of fraud or manipulation by bad actors. Because de-identified data may not be linkable to its original source, it can be difficult to discern between real data, that has a legitimate source, and fake data, that has no legitimate source. Accordingly, it is desirable to perform de-identification in such a way that the recipient, e.g., somebody paying for the data or somebody inspecting the data for regulatory purposes, can trust that the de-identified data is legitimate, e.g., originating from trustworthy sources. For example, one problematic case occurs, when de-identified data is illegally duplicated. Especially, if a monetary value is attached to the data, e.g., if the researchers pay for access to the data, there may be an incentive for such duplicity, e.g., to artificially increase the amount of data. Since the data is de-identified, it is difficult to verify if two records are really different. Apart from bad faith, duplicated records may also occur due to error, e.g., programming errors, errors of the operator and so on. It is desired that receivers, e.g., researchers, are able to verify this.

Further complicating matters is that authentication measures are hard to use. For example, an authentication tag associated with a record could simplify be duplicated as well. Moreover, such an authentication tag needs to be verifiable from the de-identified data, rather than from the full record. Further complicating the matter is that the final recipient of the data, e.g., the researcher may not be in direct contact with the data issuer. Typically, there is a selector, e.g., a broker in between issuer and receiver, e.g., that channels the rights data to the right researcher. However, this means that de-identification is preferably performed after the data has been provided to the selector.

In fact, direct contact between issuer and receiver may be impossible. For example, the issuer may be an organization or machine that is no longer active or that has been decommissioned. There is a desire for a secure way of de-identifying data, which is preferably independent of the issuer of the data, while still allowing verification by recipients of the data.

SUMMARY OF THE INVENTION

Ensuring authenticity may be performed using conventional techniques, for example by sending a request to all of the originators of the data to digitally sign off on the de-identified data, proving that they approve of it. However, this is cumbersome, often expensive and may not even be possible, e.g., if the originator is an organization or machine that has been decommissioned. Accordingly, there is a need for better automated techniques to ensure trustworthiness of selectively disclosed records.

In order to address these and other problems, a system for selectively disclosing attributes of a record is proposed as defined by the claims. The system may comprise an issuer device for providing a record to a selector device for selective disclosure; a selector device for selectively disclosing parts of the record to a receiver device; and a receiver device for selectively obtaining the parts of the record.

The record may comprise one or more attributes. In a selective disclosure, the selector device may determine one or more attributes to be disclosed as a subset of the one or more attributes, and one or more data entries to be disclosed as a subset of the multiple data entries. The record may be a personal information record, e.g., the attributes may comprise information about a person. However, records comprising other types of sensitive information are equally well possible.

The attributes are typically from a predefined set, e.g., if multiple records are processed by the system, each record may provide values for the same set of attributes. For example, one or more records may represent phenotype information about a person, e.g., length, hair colour, diagnosis of a particular medical condition, etc. The values for the attributes in a particular record are typically fixed throughout the lifetime of a record. Attributes are typically numeric, categorical, strings of fixed length, etcetera.

Various types of data may be linked to the signatures. For example, the data may represent a genome portion of the person that the record represents, e.g., a single nucleotide polymorphism (SNP), e.g., as encoded by a data line of a Variant Call Format (VCF) file of genomic data.

To still enable selective disclosure of both attributes in a secure way, the inventors have devised for the issuer device to generate digital signatures on the attributes, using an issuer private key of which the corresponding issuer public key is known to the receiver device. As is known, a digital signature on a message allows somebody with the issuer public key to establish that the message has been signed by a party holding the corresponding private key. In this case, the issuer device may generate a digital signature over the one or more attributes, e.g., over an attribute message that comprises the one or more attributes.

Accordingly, these digital signatures may allow establishing authenticity of the attributes of the record, e.g., their provenance. In this case, the digital signatures are preferably chosen such that they efficiently allow performing so-called zero-knowledge proofs on them, as discussed shortly.

Thus, the issuer device according to an embodiment may determine a secret record identifier, e.g., a randomly generated identifier that is specific to the particular record, and may include it in the attribute message and optionally in data messages that it signs for that record. The issuer device can then provide the record, the secret record identifier, and the digital signatures to the selector device. The secret record identifier may thus be used to guarantee that respective digital signatures correspond to a single record provided by the issuer device.

When performing a selective disclosure, the selector device could now provide the attributes to be disclosed, along with their signatures, to the recipient device. However, the attribute message can also contain non-disclosed attributes, but the recipient device would normally still need those attributes to verify the signature. Also, the signatures contain the secret record identifier so the recipient would normally need the secret record identifier to verify the signatures. So if, in two different disclosures, the recipient obtains non-overlapping sets of attributes from the same record, the recipient may link these two different partial records to each other based on the secret record identifier. Or, the recipient may use the secret record identifier to link its partial record to other partial records received by different recipients.

Moreover, if the attribute messages are de-identified, it becomes hard for a receiver to verify if any of the records are duplicated. Interestingly, as discussed below, the secret record identifier may remain hidden to a recipient device. Instead, the selector device may be configured to determine a public record identifier from the secret record identifier. The public record identifier may be provided to the receiver device along with those one or more attributes that are to be disclosed. For a given disclosure of records, the public record identifiers may be bijective with the secret record identifiers, that is, two public record identifiers are equal if the corresponding secret record identifiers are equal.

The inventors devised for the selector device to use a zero-knowledge proof to prove to the receiver that the provided values belong to a single record signed by the issuer device. As is known from cryptography, a zero-knowledge proof is a method by which one party, the prover, can prove to another party, the verifier, that they know a value satisfying a certain property. In a zero-knowledge proof, interestingly, this is done without the prover disclosing the value to the verifier. For example, in a zero-knowledge proof, the verifier knows a public key and the prover can prove to the verifier that it knows the private key corresponding to that public key without revealing the private key to the verifier.

In this case, the selector device may perform a zero-knowledge proof with the receiver device wherein the selector device proves knowledge of the secret record identifier, the digital signature on the attribute message, and digital signatures on the data messages. The selector device furthermore proves that he has knowledge of a secret record identifier that corresponds to the public record identifier.

In other words, the selector device typically does not disclose the secret record identifier or any of the digital signatures to the receiver device, but instead proofs that it knows a valid identifier and signatures. Concrete examples of efficiently constructing such proofs are provided below, although it is noted that generic techniques are available in the literature that allow proving knowledge of data satisfying arbitrary relations, so that any digital signature scheme and any general zero knowledge proof system can be used in principle.

Concerning the attributes, the selector device may prove that the digital signature on the attribute message is a digital signature on a message comprising at least the one or more attributes to be disclosed and the secret record identifier. The receiver device may verify this part of the proof with respect to the one or more attributes that it has obtained from the selector device to ascertain correctness of the received attributes. The selector device may also prove that the digital signature is signed with a private key corresponding to the issuer public key, which the receiver may verify using the issuer public key. By performing this part of the proof as verifier, the receiver device may thus obtain assurance that attributes it has obtained from the receiver device are indeed part of a record provided by the issuer device.

Interestingly, the selector device may select a public table key, and determine the public record identifier from the secret record identifier as well as from the public table key. For example, the selector device could generate a table key pair, e.g., a private table key and a corresponding public table key to obtain the public table key. Interestingly, the private table key is not needed. For example, the public table key may serve as a fixing point for the ID's, an application in which the private key is not needed. Instead of generating a table key pair, the selector device could directly obtain a point in the corresponding group $G$, or $G_1$ to obtain the public table key, without first generating a private table key. For example, one could hash a phrase to a point in the group, and disclose the phrase to the receiver device. An advantage of generating a random private key is to reduce the change of mistakenly using the same public table key twice.

The public table key may be provided to the receiver device, and used in the zero knowledge proof to prove knowledge of a secret record identifier that corresponds to the public record identifier and public table key. The public table key allows the selector device to control for which disclosures a recipient device should be able to keep records apart from each other. Using the same table key gives the guarantee that public record identifiers are equal if and only if the corresponding secret record identifiers are equal. But public record identifiers that were computed for a different table key will be unequal regardless if the corresponding secret record identifiers are equal or not. In this manner, a recipient device can verify duplicates in a set of data that he receives, but he is still not able to collate the received data with data received at a different occasion or by a different recipient device.

In an embodiment, separate digital signatures may be computed by the issuer on data messages comprising respective data entries, e.g., one for each data entry. The issuer device according to an embodiment may include the secret record identifier in the attribute message also in one or more data messages that it signs for that record. This allows the use of different signature schemes depending on the data type. It is however noted that this approach is optional as data messages may be linked to the record in other ways, e.g., by including their hash in an attribute.

Concerning the data entries, the selector device may prove that the digital signatures on the data messages are digital signatures on messages comprising the data entries to be disclosed and each comprising the secret record identifier, e.g., respective messages each comprising a data entry and the second record identifier. The receiver device may verify this part of the proof with respect to the data entries that it has obtained from the selector device to ascertain their correctness. The selector device may also prove that the digital signature is signed with a private key corresponding to the issuer public key, which the receiver may verify using the issuer public key. By performing this part of the proof as verifier, the receiver device may thus obtain assurance that the data entries it has obtained from the receiver device are part of the record provided by the issuer device. In particular, the proof may guarantee that each of the digital signatures comprises the secret record identifier and is thus part of the same record provided by the issuer device; still the receiver device may not actually learn the secret record identifier, preventing linking between partial records obtained in different selective disclosures.

Thus, a system is provided wherein a selector device can provide attributes of a record to a receiver device with improved privacy and/or authenticity guarantees. Moreover, different devices are provided that each provide particular features contributing to the various advantages. For example, the issuer device may determine a secret record identifier and include it in respective digital signatures for a record. The digital signatures are preferably of a type that allows efficient zero-knowledge proofs to be performed on them, examples of which are provided below, although any type of digital signature can be used in combination with a suitable zero-knowledge proof system. As another example, the selector and receiver device may perform a zero-knowledge proof to ascertain to the receiver device that the selectively disclosed values belong to a single record of the issuer device.

Because of the discussed measures, the receiver device may obtain guarantees that the obtained attributes belong to a single record provided by the issuer device. Still, the receiver device typically does not learn undisclosed attributes or data entries, or even how many data entries the record comprises. In particular, although parts of the records are linked by an identifier, this identifier may be a secret record identifier that the receiver device does not learn. The burden to perform the selective disclosure is removed from the issuer device, which may only need to provide its record once to the selector device and may not need to be involved afterwards. The system may be particularly suitable for large and/or dynamic sets of data entries, since a selective disclosure of a subset of the multiple data entries typically involves computation and communication scaling in the number of disclosed data entries, not in the total number of data entries. For example, instead of disclosing a full genome, only relevant portions may be disclosed, with the disclosure scaling only in the number of relevant portions. Accordingly, improved selective disclosure of parts of a record is provided.

In an embodiment, the attributes of the record may comprise one or more phenotype attributes about a person. The data entries of the record may comprise one or more genome portions of the person. For example, the system may be a system for providing genomic data to a researcher for medical research. Given the sensitivity of genomic data and also to improve compliance with privacy regulations in various jurisdictions, it is important for such a record to be de-anonymized; at the same time, the number of genomic portions in the record may be large, e.g., the record may comprise the whole sequenced genome of the person or large parts of it. In such cases, allowing selective disclosure of a subset of the set of genomic portions as described, hence the beneficial scaling characteristics as described herein are particularly relevant.

Various digital signature schemes can be used to sign the attribute message and the data messages for the multiple data entries. As discussed before, in principle any digital signature scheme can be used. Various particularly advantageous options are now discussed.

Various embodiments are based on anonymous credentials. Anonymous credentials are known per se in the art as a way for a user to obtain a certification by a credential issuer on one or more of its attributes, e.g., the user's age and country of origin. The user can anonymously show the credential to a third party to prove that he/she satisfies particular properties, e.g., the age is at least 18, without revealing information that allows linking back to the user. Attributes of anonymous credential schemes are typically assumed to be numeric; other types of attributes can be encoded in various ways, e.g., a textual attribute may be encoded as a numeric attribute by applying a one-way function to the text, etc.

Examples of such anonymous credential schemes are disclosed, for example, in J. Camenisch et al., "Signature schemes and anonymous credentials from bilinear maps", Proceedings CRYPTO '04 (incorporated herein by reference insofar as the description of the anonymous credential scheme is concerned) and in J. Camenisch et al., "An Accumulator Based on Bilinear Maps and Efficient Revocation for Anonymous Credentials", Proceedings PKC '09 (incorporated herein by reference insofar as the description of the anonymous credential scheme is concerned).

Interestingly, in an embodiment, anonymous credentials may be re-purposed for the systems presented herein, in the sense that the digital signature on the attribute message as presented herein comprises an anonymous credential signed with the issuer private key. The anonymous credential may have the one or more attributes of the record and the secret record identifier as attributes. In effect, anonymous credentials are used "in reverse". Traditionally, a user and an issuer run an issuance protocol for the user to obtain a credential about attributes that the issuer may not know the values of; upon request by a third party to prove a property, the user uses the issued anonymous credential. In contrast, in the present case, no such issuance protocol is needed and the issuer device can provide the credential to the selector device directly. Unlike in the traditional case, the selector device that holds the credential is typically an intermediate party to whom the credential does not relate, e.g., the selector device can hold different records about different entities, e.g., persons, that it is not related to. The selector device can then selectively disclose parts of these records and/or show or prove properties of attributes out of its own volition. Despite these differences, interestingly, anonymous credentials can still be used as a building block in the present system.

In some embodiments, the digital signature scheme used for the data messages is the same as the one for the attribute message, e.g., a digital signature for a data entry may be an anonymous credential with the secret record identifier and the data entry, or a one-way function applied to the data entry, as attributes. This leads to a particularly simple design.

In various embodiments, the selector device obtains multiple records, e.g., multiple records from a single issuer device, multiple records from multiple issuer devices, etc. The selector device may thus act as a system for providing access to the multiple records to receiver devices, for example, a centralized access point that selects and provides data to recipients, e.g., medical researchers that want to perform research on genomic data.

In an embodiment, the issuer device is configured to obtain a record query and select one or more of the multiple records to be disclosed according to the record query. For example, the receiver device may provide the record query, or the record query may be otherwise determined. Generally, the record query provides one or more conditions for records to be satisfied. For example, the issuer device may select all record satisfying the conditions, the first X records satisfying the conditions, X random records satisfying the conditions, etcetera. For example, a condition may be a condition on an attribute, e.g., the condition may state that an attribute is equal to a particular value or to another attribute, that the attribute lies in a certain range, etcetera. A condition can also be a condition on a data entry, e.g., existence of a data entry containing certain data, e.g., a genome having a particular mutation. The issuer device may then selectively disclose attributes for each current record of the selected records, e.g., by repeating the determining of attributes to be disclosed, the providing of the attributes of the current record, and the performing of the zero-knowledge proof, for each current record of the one or more selected records. This way, the receiver device may receive records relevant for its particular use.

In an embodiment, the selector device proves to the receiver device, using the zero-knowledge proof for a current record, that the current record satisfies the record query. For example, the record query may comprise a condition, e.g., age>65, on an attribute which is not provided to the receiver device. The zero-knowledge proof may be used to prove that such a condition holds. It is also possible to prove properties of data entries that are themselves not provided to the receiver device. Conditions with respect to disclosed attributes typically need not be proven in zero-knowledge because the receiver knows them. It is also not strictly necessary to prove the full record query, e.g., for efficiency reasons only the most relevant conditions of the record query may be proven. Interestingly, by means of the zero-knowledge proof, the receiver device may receive assurance that the records it receives satisfy the record query, e.g., an age was above 65, while not learning details, e.g., the exact age. Accordingly, a particularly beneficial combination of data minimization and authenticity may be obtained.

In an embodiment, the selector device further obtains a data entry query, for example, received from the receiver device or otherwise determined. The selector device may determine the one or more data entries to be disclosed according to the data entry query. For example, the data entry query may specify one or more conditions for data entries to satisfy, may specify one or more particular data entries to include, e.g., genome data at particular locations, etc. This way, it is possible to control which data entries to provide. A similar approach may be used to determine which attributes to disclose.

Of course, the use of record queries and/or data entry queries to control which records and/or parts of records to disclose, does not exclude the possibility for the selector device to perform checks on the data to be disclosed to a receiver device, e.g., the selector device may perform a check that the attributes of a set of records to be disclosed to a receiver device satisfy a certain data minimization property, e.g., a privacy property such as k-anonymity.

In an embodiment, the zero-knowledge proof may involve the selector device providing a commitment to the secret record identifier to the receiver device and proving knowledge of the digital signatures with respect to the commitment. For example, the commitment may be a Pedersen-type commitment as is known in the art. Providing the comment to the receiver device may allow the receiver device to efficiently establish that the same secret record identifier is included in respective digital signatures by providing that each of those digital signatures includes the same secret record identifier as the comment.

In an embodiment, the zero-knowledge proof may be a non-interactive zero-knowledge proof determined and sent by the selector device and received and verified by the receiver device. This may reduce the amount of communication needed, and/or allow data transfer when both parties are not online at the same time.

The techniques described herein may be applied in a wide range of practical applications. Such practical applications include platforms for providing de-anonymized datasets, for example, to researchers in a medical or financial context. For example, such a platform may be operated by a number of hospitals or an external service provider. More generally, any type of application where selective disclosure of parts of a record, especially a record containing a flexible or large set of data entries, is needed, may benefit from the techniques described herein.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings.

Figure 1A:
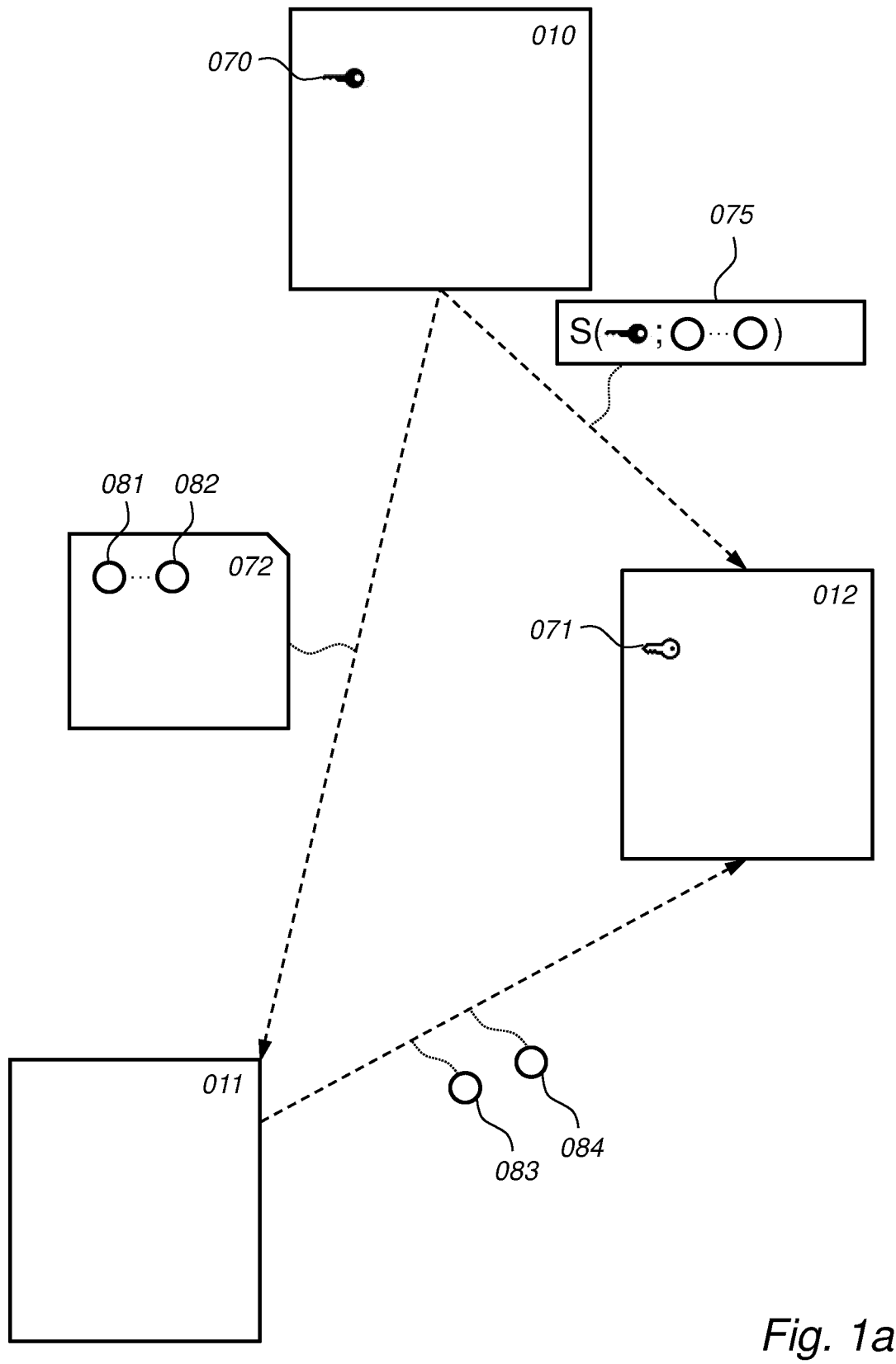
FIG. 1a schematically shows an example of a selective disclosure system that does not involve zero-knowledge proofs.

LIST OF REFERENCE NUMERALS 000, 100 a selective disclosure system
010, 110, 210 an issuer device
011, 111, 311 a selector device
012, 112, 412 a receiver device
130, 131, 132 a memory
140, 141, 142 a processor
150, 151, 152 a network interface
160 a computer network
070, 170, 270 an issuer private key
071, 171, 471 an issuer public key
072, 172, 272, 372 a record
173, 273, 373 a secret record identifier
174, 374, 474 a zero-knowledge proof
175, 275, 375 public record identifier
075 a digital signature on disclosed attributes
180, 280, 380 a digital signature on an attribute message
081-084, 181-184, 281-282, 381-384, 483-484 an attribute
241 an identifier generation unit
242 an attribute signing unit
341 a selection unit
342 a proving unit
441 a verification unit
800 a computer readable medium
810 a writable part
820 a computer program
910 integrated circuit(s)
920 a processing unit
922 a memory
924 a dedicated integrated circuit
926 a communication element
930 an interconnect
940 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a shows an example of a system 000 for selectively disclosing attributes of a record which does not use signatures on attributes or zero-knowledge proofs as defined by the claims.

Shown in the figure is an issuer device 010 that wishes to enable a selector device 011, e.g., a genomics platform, to selectively disclose parts of a record 072. The particular record 072 shown in the figure comprises values for a predefined set of attributes 081-082, e.g., phenotype and/or genotype data. Issuer device 010 provides the record to selector device 011.

When selector device 011 wants to selectively disclose parts of record 011 to a receiver device 012, the selector device may select one or more of the attributes 081-082, in this case, attributes 083 and 084, to be disclosed to the receiver device 012. The receiver device 012 may receive the attributes 083, 084 to be disclosed.

Although the steps so far provide selective disclosure, e.g., only part of the record is obtained by receiver device 012, no authenticity is provided yet, e.g., the receiver device 012 does not obtain assurance that the received attributes originate from a trusted issuer device 010, and/or that the received attributes belong to the same record, e.g., all refer to the same person. To obtain such assurance a digital signature 075 may be employed. Digital signature 075 in this example may be a conventional signature, e.g., an RSA or ECDSA signature. The notation S(X; Y) adopted in the figure and throughout this description may denote a signature with private key X on a message Y. At the time of disclosure, the issuer device 010 may provide to the receiver device 012, e.g., prompted by the selector device 011, digital signature 075, signed with an issuer private key 070, on the attributes to be disclosed. Receiver device 012 may verify the digital signature 075 with respect to an issuer public key 071 corresponding to issuer private key 070. The digital signature is typically without message recovery, e.g., the message is not derived from the signature and instead the signature and message are together verified with respect to the public key 071.

Although the above system can provide selective disclosure with authenticity guarantees, it has the undesirable characteristic that the issuer device 010 needs to be involved in each selective disclosure. This is cumbersome, often expensive, and sometimes not possible, e.g., the issuer device 010 or its organization may no longer exist. Accordingly, a problem addressed below is how to perform selective disclosure with comparable authenticity guarantees, but in such a way that an issuer device does not need to be involved in a selective disclosure. Another problem is that a dishonest or careless selector device 011 may duplicate some of the records disclosed to 012. For example, de-identified record 072 may be disclosed multiple times. Being de-identified it is not possible for device 012 to verify duplication. Even if two records are identical, this may be due to the de-identification. Especially, when few attributes are disclosed and/or a large number of records is involved, two or more records may quite correctly be identical be chance. Purging such identical records would distort inferences that may be derived from the data. However, not removing duplicate records runs the same risk.

Figure 1B:
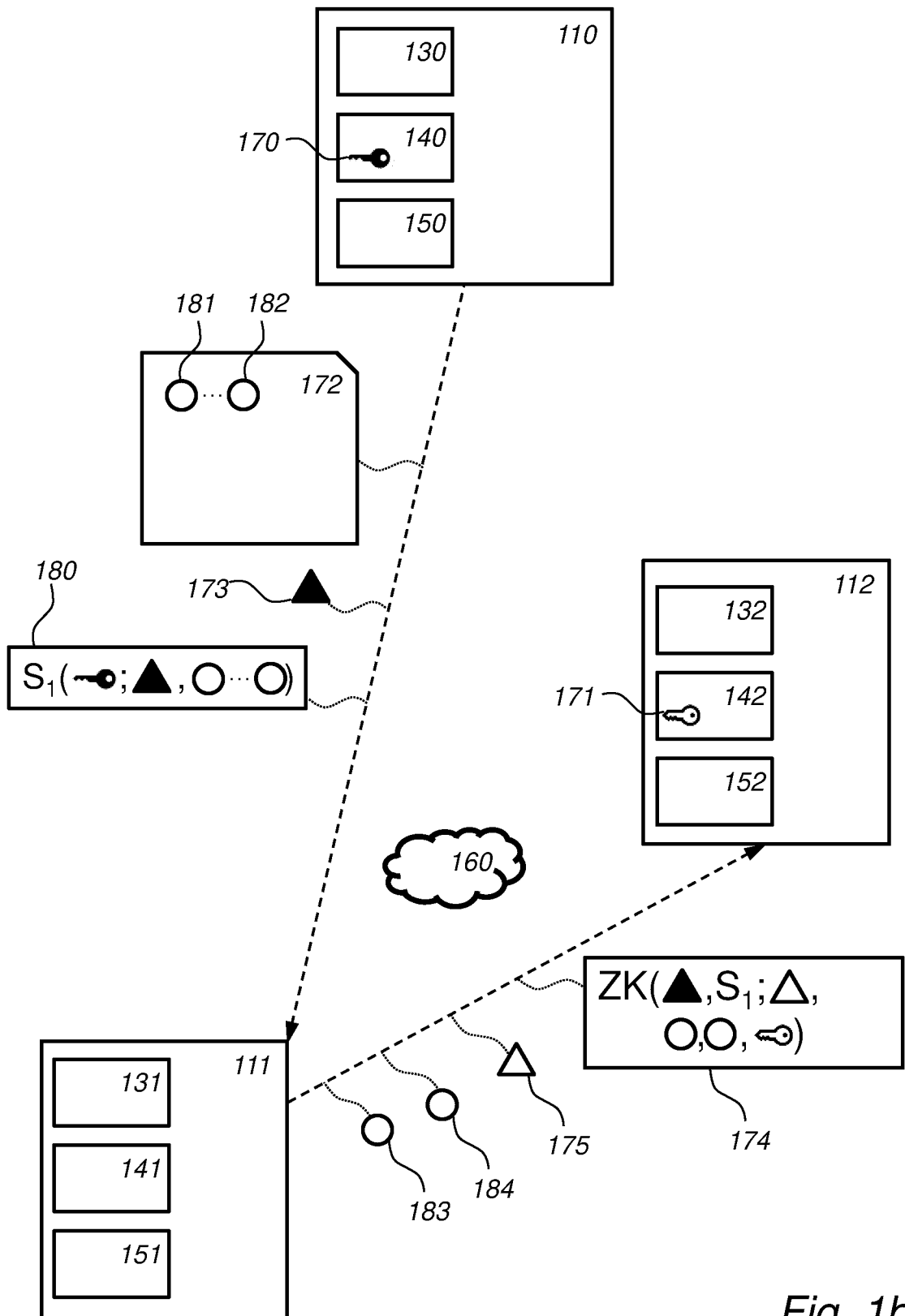
FIG. 1b schematically shows an example of an embodiment of a selective disclosure system.

FIG. 1b schematically shows an example of an embodiment of a system 100 for selectively disclosing attributes of a record 172. System 100 may comprise an issuer device 100, a selector device 111, and/or a receiver device 112.

Issuer device 110 may be for providing record 172 to selector device 111 for selective disclosure. Issuer device 110 may comprise a processor 130 and a memory 140. Memory 140 may be used for data and/or instruction storage. For example, memory 140 may comprise software and/or data on which processor 130 is configured to act. Memory 140 may also store an issuer private key 170 forming a public-private key pair with a corresponding issuer public key 171. Memory 140 may also store record 172. Record 172 may comprise one or more attributes 181-182. By way of example only, two attributes are shown. Processor 130 may be implemented as one or more processor circuits, e.g., microprocessors, ASICs, FPGA and the like. Memory 140 may comprise computer program instructions which are executable by processor 130. Processor 130, possibly together with memory 140, is configured according to an embodiment of an issuer device. Issuer device 110 may also comprise a communication interface 150 arranged to communicate with other devices, in particular, selector device 111. For example, the communication interface may comprise a connector, e.g., a wired connector, e.g., an Ethernet connector, or a wireless connector, e.g., an antenna, e.g., a Wi-Fi, 4G or 5G antenna. The communication interface may also be a storage interface to an internal or external data storage, a keyboard, an application interface (API), etc.

Issuer device 110 may be configured to determine a secret record identifier 173. Issuer device 110 may also be configured to generate a digital signature 180 using issuer private key 170 over the one or more attributes 181-182 and the secret record identifier 173. For example, processor 130 may apply a signature algorithm to an attribute message that comprises the one or more attributes 181-182 and the secret record identifier 173.

Issuer device 110 may be configured to provide the record 172, the secret record identifier 173, the digital signature 180 on the attribute message to the selector device 111.

As shown in the figure and used throughout this description, $S_1(X; Y)$ may be used to refer to digital signatures signed using private key X on a message Y, e.g., on the attribute message. The digital signatures are typically without message recovery, e.g., the digital signature may be verified together with the message using a public key corresponding to the private key.

Selector device 111 may be configure for selectively disclosing attributes of record 172 to receiver device 112. Selector device 111 may comprise a processor 131 and a memory 141. Memory 141 may be used for data and/or instruction storage. For example, memory 141 may comprise software and/or data on which processor 131 is configured to act. Memory 141 may also store record 172, secret record identifier 173, and/or digital signature 180 on the attribute message. Processor 131 may be implemented as one or more processor circuits, e.g., microprocessors, ASICs, FPGA and the like. Memory 141 may comprise computer program instructions which are executable by processor 131. Processor 131, possibly together with memory 141, is configured according to an embodiment of a selector device. Selector device 111 may also comprise a communication interface 151 arranged to communicate with other devices, in particular, issuer device 110 and receiver device 112. For example, the communication interface may comprise a connector, e.g., a wired connector, e.g., an Ethernet connector, or a wireless connector, e.g., an antenna, e.g., a Wi-Fi, 4G or 5G antenna. The communication interface may also be a storage interface to an internal or external data storage, a keyboard, an application interface (API), etc.

Selector device 111 may be configured to obtain record 172, secret record identifier 173, and digital signature 180 on the attribute message. Selector device 111 may be configured to verify digital signature 180 using the issuer public key 171. This is not necessary since, if signature 180 were incorrect, this would be uncovered later too when receiver device 112 verifies the signatures 180.

Selector device 111 may be further configured to determine one or more attributes to be disclosed as a subset of the one or more attributes 181-182. By way of example only, the figure shows two attributes 183-184 to be disclosed. Selector device 111 may be configured to provide the one or more attributes to be disclosed 183, 184 to the receiver device 112.

Selector device 111 may be further configured to determine a public record identifier 175 from the secret record identifier 173. Public record identifiers are computed from a secret record identifiers in such a way that two public record identifiers are different if and only if the two corresponding secret record identifiers are different. Thus one could verify that a de-identified record is, or is not, a duplicate of some other de-identified record by comparing their public record identifier.

Interestingly, the selector device may be configured to generate a public table key. Generating the public table key may be done by generating a private table key as well, e.g., in the form of a table key pair, but this is not necessary. The public table key is associated with a particular table of attributes as disclosed to receiver device. It may happen that information from the same records is disclosed on other occasions to this or other receiver devices and it is may be desirable to avoid that the two disclosures may be pieced together. For example, in a first disclosure to a first receiver device attributes 1 and 2 may be disclosed, whereas in a second disclosure to a second receiver device attributes 1 and 3 may be disclosed. If the two receiver devices where to collude it might be possible to reconstruct records in which attributes 1, 2, and 3 are united again. As a result privacy may be violated. Such combination of records is especially easy if the records have a unique record identifier. To avoid this possibility a new table key may be selected for each disclosure of data that should be combinable. The public record identifier may be determined from the secret record identifier and the public table key. For example, determining the public record identifier may comprise applying a bilinear map, e.g., to the public table key and to group-point depending on the secret record identifier.

The public table key may be provided to the receiver device. The effect of the different table key is that the same secret record identifiers in two data disclosures will have a different corresponding public record identifier, thus avoiding combining the data on the basis of the public record identifier.

If, on the other hand in some circumstances it may be desirable that duplicates can be checked across different disclosures then a table key may either be omitted, or the same table key may be used in the multiple disclosures.

Selector device 111 may be further configured to perform a zero-knowledge proof 174 with receiver device 112. The zero-knowledge proof is shown here as a message being sent from selector device 111 to receiver device 112, e.g., a non-interactive zero-knowledge proof, but this not necessary, e.g., the zero-knowledge proof may comprise multiple messages being exchanged between the parties, e.g., an interactive zero-knowledge proof.

As used in this figure and throughout the description, the notation ZK(X; Y) denotes a zero-knowledge proof that values X satisfy a certain property with respect to values Y. E.g., values X are comprised in the so-called witness of the zero-knowledge proof. The prover typically uses values X to perform the proof and the verifier typically verifies the proof using values Y.

In the zero-knowledge proof, the selector device may prove knowledge of:
  the secret record identifier 173;
  the digital signature 180 on the attribute message as being a digital signature on a message comprising at least the one or more attributes to be disclosed 183-184 and the secret record identifier, signed with a private key corresponding to the issuer public key 171.

Receiver device 112 may be configured for selectively obtaining the attributes 183-184 of the record 172 from the selector device 111. Receiver device 112 may comprise a processor 132 and a memory 142. Memory 142 may be used for data and/or instruction storage. For example, memory 142 may comprise software and/or data on which processor 132 is configured to act. Memory 142 may also store issuer public key 171. Processor 132 may be implemented as one or more processor circuits, e.g., microprocessors, ASICs, FPGA and the like. Memory 142 may comprise computer program instructions which are executable by processor 132. Processor 132, possibly together with memory 142, is configured according to an embodiment of a receiver device. Receiver device 112 may also comprise a communication interface 152 arranged to communicate with other devices, in particular, selector device 111. For example, the communication interface may comprise a connector, e.g., a wired connector, e.g., an Ethernet connector, or a wireless connector, e.g., an antenna, e.g., a Wi-Fi, 4G or 5G antenna. The communication interface may also be a storage interface to an internal or external data storage, a keyboard, an application interface (API), etc.

Receiver device 112 may be configured to obtain from the selector device 111 the one or more attributes 183-184. Receiver device 112 may be further configured to perform the zero-knowledge proof with the selector device 111 with respect to the obtained values 183-184 and the issuer public key 174 to ascertain that the obtained values 183-184 belong to the record 172 of the issuer device 110.

The various devices of system 100 communicate with each other over a computer network 160. The computer network may be an internet, an intranet, a LAN, a WLAN, etc. Computer network 160 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. Computer network 160 may comprise additional elements, e.g., a router, a hub.

The various devices of FIG. 1 may have respective user interfaces, which may include well-known elements such as one or more buttons, a keyboard, display, touch screen, etc. For example, the user interface of the receiver device 112 may be arranged for accommodating user interaction for obtaining parts of records satisfying particular record queries.

Interestingly, system 100 achieves what system 000 cannot. Selector device 111 is able to de-identify records, e.g., by providing only part of the record to a receiver device 112. Yet, a receiver device can verify that the part of the record that it received actually originated at issue device 110, that is, the receiver device can verify the authenticity and integrity of the received data. Moreover, receiver device 112 can verify if some of the de-identified records are duplicates of each other by verifying if any of the public record identifiers are duplicated or if any of the cannot be verified through the zero-knowledge proof. Moreover, issuer device 110 needs only to be involved at the moment that it provides the data to selector device 111. Later involvement of the issuer to prove authenticity, integrity or lack of duplication to receiver device 112 is not needed.

Figure 2:
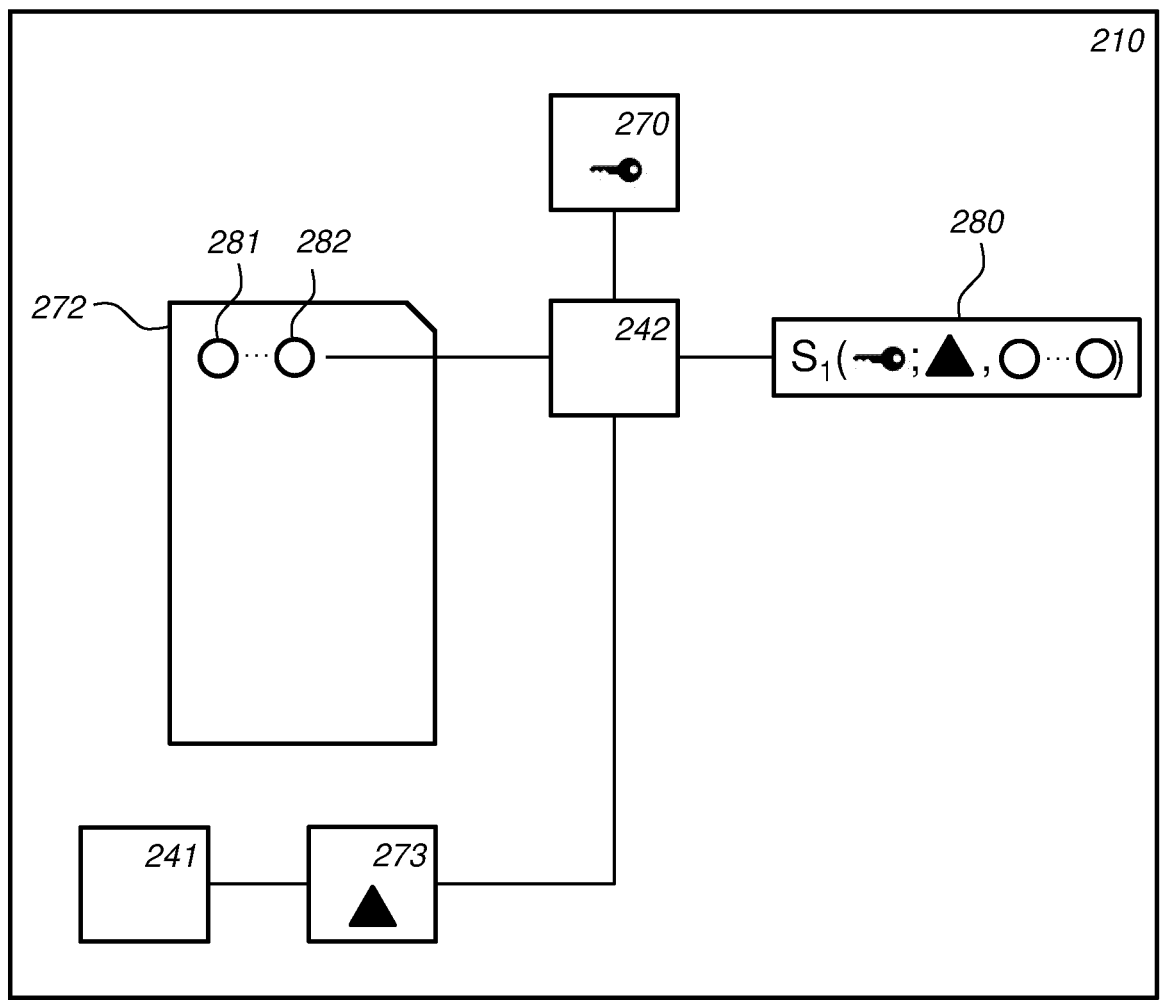
FIG. 2 schematically shows an example of an embodiment of an issuer device.

FIG. 2 schematically shows an example of an embodiment of an issuer device 210 for providing a record to a selector device for selective disclosure, for example, for use in system 100 of FIG. 1b.

FIG. 2 schematically shows functional units that may be functional units of a processor of issuer device 210 (not shown separately). For example, FIG. 2 may be used as a blueprint of a possible functional organization of the processor. For example, the functional units shown in FIG. 2, e.g., units 241-243, may be wholly or partially be implemented in computer instructions that are stored at device 210, e.g., in an electronic memory of device 210, and are executable by a microprocessor of device 210. In hybrid embodiments, functional units are implemented partially in hardware, e.g., as coprocessors, and partially in software stored and executed on device 210. For the purpose of explication, FIG. 2 also shows various elements that may be stored by the device 210 at various stages of its operation.

Shown in the figure is a record 272 comprising one or more attributes 281-282. For example, record 272 may be a genomic record. In such a case, attributes 281-282 may comprise phenotype attributes of a person, e.g., one or more of an age, a BMI, flags indicating diagnoses for one or more medical conditions, etcetera. In this example, attributes may be integers or other type of values encoded as integers. The integers are typically from a range 0, N−1 where value N is defined by the signature scheme(s) used, e.g., as discussed below.

Instead of coding information directly into an attribute, one may instead encode a hash of the information in the attribute. This functions the same way, except that, if that information is included the disclosed part of the attributes, that the information may be disclosed. The receiver device may then compute the hash form the information and compute that the signature was indeed computed over the correct hash. In this case, the hash functions as a disclosed attribute.

An alternative way to link larger amount of data is to include them in a separate message, e.g., a data message. The data message may then be signed and linked to the secret record identifier. The zero knowledge proof may then be extended in proving that the signature over the data message is indeed linked to a secret record identifier that corresponds to public record identifier. This may be a different type of signature $S_2$ than signature $S_1$ used for the attributes.

As an illustrative example, larger amounts of data that can be conveniently included in either of the above two ways is genomic information. For example, data entries of record 272 may represent single nucleotide polymorphisms (SNPs) of a person's genome. For example, record 272 may be derived from, or encoded by, a Variant Call Format (VCF) file. As is known in bioinformatics, a VCF file may be used to store gene sequence variations with respect to a reference genome. Optionally, a VCF file can also store phenotype information. A portion of a VCF file is shown below:

| #CHROM | POS | ID | REF ALT | QUAL | FILTER | INFO | FORMAT | |
|---|---|---|---|---|---|---|---|---|
| chr1 | 82154 | rs4477212 | a | . | . | . | GT | 0/0 |
| chr1 | 752566 | rs3094315 | g A | . | . | . | GT | 1/1 |
| chr1 | 752721 | rs3131972 | A G | . | . | . | GT | 1/1 |
| chr1 | 798959 | rs11240777 | g | . | . | . | GT | 0/0 |
| chr1 | 800007 | rs6681049 | T c | . | . | . | GT | 1/1 |
| chr1 | 838555 | rs4970383 | c | . | . | . | GT | 0/0 |
| chr1 | 846808 | rs4475691 | C | . | . | . | GT | 0/0 |
| chr1 | 854250 | rs7537756 | A | . | . | . | GT | 0/0 |
| chr1 | 861808 | rs13302982 | A | . | . | . | GT | 1/1 |
| chr1 | 873558 | rs1110052 | A G | . | . | . | GT | 1/1 |
| chr1 | 882033 | rs2272756 | G T | . | . | . | GT | 0/1 |
| chr1 | 888659 | rs3748597 | T C | . | . | . | GT | 1/1 |
| chr1 | 891945 | rs13303106 | A G | . | . | . | GT | 0/1 |

For example, for a record corresponding to a VCF file as illustrated above, data entries of the record may correspond to lines of the VCF file. For example, a data entry may be a string representing a line of a VCF file. The hash of the VCF file may be included as an attribute. Alternatively, the VCF file may signed and linked to the secret record identifier.

Further shown in the figure is an identifier generation unit 241. Identifier generation unit 241 may generate secret record identifier 273. Typically, secret record identifier 273 is an integer, e.g., from the same range $0, \ldots, N-1$ as attributes 281-282. It is beneficial to generate secret record identifier 273 randomly from a large domain such that it is unpredictable to other devices and to minimize the probability of collision between identifiers, e.g., generated by other devices. For example, identifier generation unit 241 may generate secret record identifier 273 randomly from at least $2^{30}$, at least $2^{62}$, or $2^{126}$ possible values.

Also shown is an issuer private key 270, which may be generated by the issuer device 210 or otherwise obtained. Issuer private key 270 can be any kind of secret key compatible with the digital signature schemes used to generate digital signatures 280 discussed below.

Shown further is an attribute signing unit 242. Attribute signing unit 242 may generate digital signature 280 on an attribute message using issuer private key 270. The attribute message may comprise the one or more attributes 281-282 and the secret record identifier 273. Although, as discussed elsewhere, any signature scheme $S_1$ can in principle used, it is particularly beneficial for the digital signature 280 to be an anonymous credential; in other words, for the signature generation to be an algorithm to generate an anonymous credential. The secret record identifier 273 may be used as an attribute of the anonymous credential.

As a concrete example, of an anonymous credential scheme is the following: given an ordered list of attributes m, the signature may be a quadruple (c, s, γ, σ) where attribute signing unit 242 generates values c, s, and γ randomly and computes σ as $$\sigma = \left(h_0 \left(\prod_{i \in H} h_i^{m_i}\right) \check{h}^\gamma \tilde{h}^s\right)^{1/(x+c)},$$

where x is the secret key 273 whose associated public key $y=h^x$ is trusted by the receiver device. H may be a set of generators $h_i$ of a group G of prime order q, and similarly for h and $h_0$. Here, γ, 273 is the secret record identifier which is in this notation considered to be part of the signature. Interestingly, $\check{h}$ may be a generator of group G used to include secret record identifier γ into the signature. Proofs may be adapted from the papers "Signature schemes and anonymous credentials from bilinear maps" and "An Accumulator Based on Bilinear Maps and Efficient Revocation for Anonymous Credentials" mentioned above.

Issuer device 210 may further provide record 272, secret record identifier 273, and digital signature 280 on the attribute message to the selector device, e.g., send them via a communication interface (not shown).

Although, so far, the signing process has been discussed with respect to a single record 272, the same units 241-243 may also be used to produce respective secret identifiers and sets of signatures for multiple records. Also, issuer device 210 may update attributes of a record by having units 242, 243 determine new attribute message signatures as appropriate. If separate data is used, e.g., genomics information, than these may be provided to the selector as well.

Figure 3:
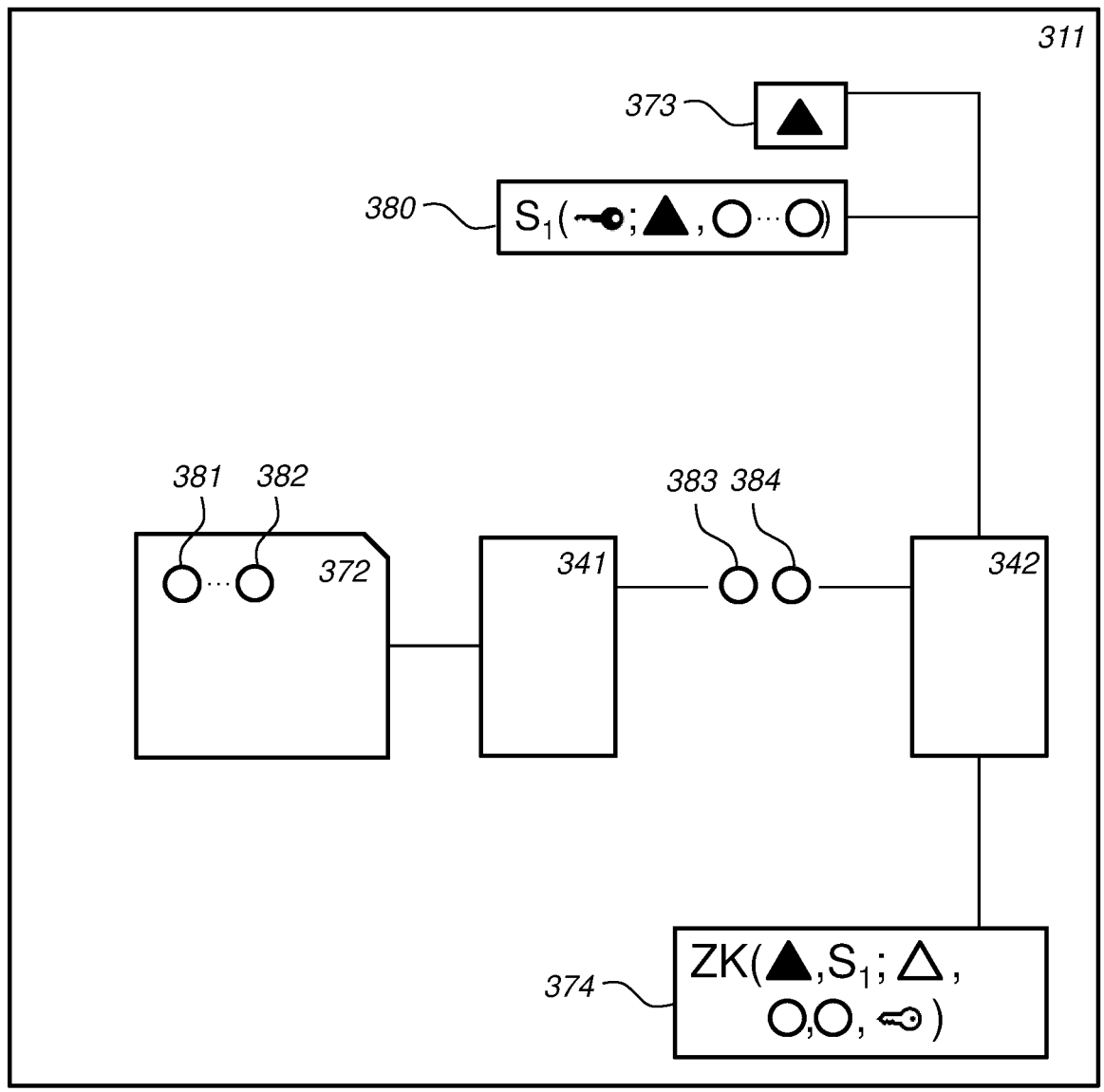
FIG. 3 schematically shows an example of an embodiment of a selector device.

FIG. 3 schematically shows an example of an embodiment of a selector device 311 for selectively disclosing attributes of a record 372 to a receiver device, for example, for use in system 100 of FIG. 1b.

FIG. 3 schematically shows functional units that may be functional units of a processor of selector device 311 (not shown separately). For example, FIG. 3 may be used as a blueprint of a possible functional organization of the processor. For example, the functional units shown in FIG. 3, e.g., units 341-342, may be wholly or partially be implemented in computer instructions that are stored at device 311, e.g., in an electronic memory of device 311, and are executable by a microprocessor of device 311. In hybrid embodiments, functional units are implemented partially in hardware, e.g., as coprocessors, and partially in software stored and executed on device 311. For the purpose of explication, FIG. 3 also shows various elements that may be stored by the device 311 at various stages of its operation.

Shown in the figure are a record 372 comprising one or more attributes 381-382; a secret record identifier 370; a digital signature 380 on an attribute message generated using an issuer private key, where the attribute message comprises the one or more attributes 381-382 and the secret record identifier 370. For example, the record, secret record identifier, and digital signatures may correspond to those of FIG. 2. For example, this data may be obtained from an issuer device.

Also shown is a selection unit 341. Selection unit 341 may determine one or more attributes to be disclosed to the receiver device as a subset of the one or more attributes 381-382. In this particular example, attributes 383, 384 are selected. The attributes to be disclosed may be determined based on a data entry query, e.g., provided by the receiver device, e.g., the data entry query may indicate particular data entries to be disclosed and/or criteria for selecting data entries, and similarly for the attributes. The selection unit 341 may additionally perform the selection based on criteria and/or checks that are not provided by the receiver device, e.g., a privacy policy, e.g., provided by the issuer device along with the record.

For example, a record 372 may comprise personally identifying information, e.g., data that could potentially be used to identify a particular person. Examples include a full name, Social Security number, driver's license number, bank account number, passport number, and email address. Such information may be removed from record 372 before sending the information to the receiver device. A record 372 may also comprise attributes that although not directly personally identifying may nevertheless be privacy sensitive, e.g., age, weight, etc. If such information is not needed, it may be avoided to send these attributes to a receiving device.

Shown furthermore is a proving unit 342. Proving unit 342 may perform a zero-knowledge proof 374 with the receiver device. As is known in cryptography and discussed elsewhere, a zero-knowledge proof is for letting a prover prove a statement to a verifier. The zero-knowledge proof preferably satisfies the properties of completeness, soundness, and zero-knowledge.

Completeness means that if the statement is true, then a prover who follows the protocol will convince a verifier who follows the protocol. Soundness means that, if the statement is false, a cheating prover is unlikely to be able to convince a verifier who follows the protocol. In the case of a proof of knowledge, completeness may also mean not only that the statement is true but also that the prover knows certain values, called the witness, occurring in the statement. Completeness typically holds up to a certain soundness error by which a cheating verifier succeeds in convincing the verifier; the zero-knowledge proof may however comprise multiple instances of the protocol to reduce the soundness error. Zero-knowledge means that the verifier does not learn information from the proof other than the fact that the statement is true. Zero-knowledge may be computational and/or statistical.

In this case, the selector device may use zero-knowledge proof 374 to prove knowledge of the secret record identifier 373; the digital signature 380 on the attribute message as being a digital signature on a message comprising at least the one or more attributes 383, 384 to be disclosed and the secret record identifier 373, signed with a private key corresponding to the issuer public key. In other words, witnesses of the zero-knowledge proof may include the secret record identifier and the signatures; the public values with respect to which their validity is proven may include the attributes 383, 384, and the issuer public key.

In particular, in order to prove that the signatures 380 comprises the secret record identifier 373 without disclosing the secret record identifier to the receiver device, proving unit 342 may construct a commitment to the secret record identifier, e.g., a Pedersen-type commitment, and provide it to the receiver device. Accordingly, the zero-knowledge proof 374 may prove that the same secret record identifier 373 is included in each signature and in the commitment. For various kinds of zero-knowledge proofs and signature schemes, this may be an efficient way of proving the existence of a common secret identifier.

Many different types of zero-knowledge proofs are known in the art and may be readily applied, e.g., Σ-protocols such as the Schnorr protocol; non-interactive zero-knowledge proofs, e.g., obtained from an interactive zero-knowledge protocol by means of the Fiat-Shamir heuristic; zero-knowledge succinct non-interactive arguments of knowledge (zk-SNARKs), etc.

It is however particularly beneficial if, rather than relying on generic techniques, signatures scheme $S_1$ for the attributes are used that admit efficient proofs of knowledge of the signatures. For example, it can be beneficial to base signature scheme $S_1$ on an anonymous credential scheme, e.g., the scheme by Camenisch et al. discussed above, since they admit efficient zero-knowledge proofs to be performed. For example, the use of signatures based on the principle of exponentiating a group element is particularly efficient, since again, this admits efficient zero-knowledge proofs.

A particularly beneficial implementation based on an attribute signature 380 is now discussed in detail. The Camenisch-Stadler notation is used as described in J. Camenisch et al., "An Accumulator Based on Bilinear Maps and Efficient Revocation for Anonymous Credentials", Proceedings PKC '09. The attribute signature 380 may have the form:

$$\sigma = \left(h_0 \left(\prod_{i \in H} h_i^{m_i}\right) \check{h}^\gamma \tilde{h}^s\right)^{1/x+c}$$

It is noted that the zero-knowledge proof is presented here as an interactive proof, but with the understanding that it can be made non-interactive, e.g., using the Fiat-Shamir heuristic. The proof can also be extended to prove properties about attribute values, e.g., to prove that the record satisfies a record query, e.g., 30≤BMI≤40. Proofs about multiple records can also be performed in parallel and/or combined into one non-interactive zero-knowledge proof using known techniques.

In detail, in this example, proving unit 342 may compute public record identifiers for the record m. For example, he may select a private table key a and compute the public table key $K=h^a$ for the table. The public/private table key pair may be unique for this particular table. The public table key may also be selected as a random point in $G_1$ through other means, e.g., by randomly generating coefficients of the point, e.g., by hashing a phrase, e.g., a public phrase. For each row of the de-identified data set the creator may now generate a unique public record identifier ID as follows: $ID = e(K, \check{h}^\gamma)$. Furthermore, in this example, proving unit 342 may construct multiple commitments that may be committed to the receiver device:

$X = \check{h}^\gamma \cdot \check{h}^t$, for generator $\check{h}$ and randomly generated value t, to secret record identifier $\gamma$;

$C = h_p \check{h}_{open}$, and randomly generated value open; and $A = \sigma h^\rho$.

In a first part of the zero-knowledge proof, proving unit 342 may prove knowledge of signature 380 as a signature on a message comprising the one or more attributes to be disclosed and a secret record identifier corresponding to commitment X described above, and signed with private key x corresponding to public key $y = h^x$. Setting mult=ρc, and tmp=open·c, a first part of the zero-knowledge proof may be used to prove that:

$$C = h^p \check{h}^{\widetilde{open}} \wedge 1 = C^c h^{-mult} \check{h}^{-tmp}$$

$$\frac{e\left(h_0 \cdot \prod_j h_j^{m_j} \cdot X, h\right)}{e(A, y)} =$$

-continued $$e(A, h)^c \cdot e(\tilde{h}, y)^{-p} \cdot e(\tilde{h}, h)^{-mult} \cdot e(\tilde{h}, h)^{-s} \cdot \prod_j e(h_j, h)^{-m_j} \cdot e(\tilde{h}, h)^t$$

Here, $A = \sigma \tilde{h}^p$ is a blinding of signature σ with random value p generated by proving unit 342 and provided to the receiver device. $\Pi_j h_j^{m_j}$ sums over disclosed attributes whereas $\Pi_j e(h_j, h)^{-m_j}$ sums over non-disclosed attributes, optionally encoded as hashes, etc.

In a second part of the zero knowledge proof it may be proven that the secret record identifier corresponds to the public record identifier, e.g., by proving that:

$$\frac{e(h, X)}{ID} = e(K, h)^{-\gamma} \cdot e(h, \hat{h})^{\gamma} \cdot e(\tilde{h}, h)^t$$

An effect of the commitments is that the corresponding data is blinded from the receiving device, yet the selector device is bound to a particular value of the underlying data. The commitments need not to be opened. Above, e is used to denote a cryptographic pairing, e.g., a type-3 elliptic curve pairing such as a pairing over a 256-bit Barreto-Naehrig (BN) Curve as known in the art. The pairing over the BN curve may be denoted formally as follows: $e(G_1 \times G_2) \to G_T$. The various generators used above, e.g., the generators of H, the introduced generator $\hat{h}$, etc., may be generators of $G_1$, generated in a nothing-up-my-sleeves method, e.g., hashing a base generator of $G_1$ until a point is encountered.

It is possible to explicitly prove, in a further zero-knowledge proof, that $$X = \hat{h}^{\gamma} \cdot \tilde{h}^t,$$

e.g., knowledge of the secret identifier in the commitment X may be proven. Interestingly, this is not required though, as X is used in the second part of the zero knowledge proof mentioned above as well. The above proofs may be based on the Schnorr proof system as disclosed, e.g., in U.S. Pat. No. 4,995,082A. Interestingly, the above proofs may deviate from the zero-knowledge proof of Camenisch Although the above procedure has been discussed for a single record, it will be understood that selector device 311 can be readily adapted to the case where it stores multiple records and associated information, e.g., from multiple issuer devices. In such a way, selector device 311 may also selectively disclose parts of the multiple records. For example, as also discussed elsewhere, selector device 311 may obtain a record query and select one or more of the multiple records according to the record query. The steps performed by units 341 and 342 may be repeated for respective selected records to perform the selective disclosure for the respective records.

Interestingly, also the zero-knowledge proof for a record may then be used to prove that the current record satisfies the record query. For example, the record query may comprise a condition on an attribute, e.g., age>65, 40≤age≤65, etc. For example, in the particular case of using the adapted Camenisch anonymous credentials as signatures 380, known techniques for proving properties about attributes of such a credential may be readily used.

Figure 4:
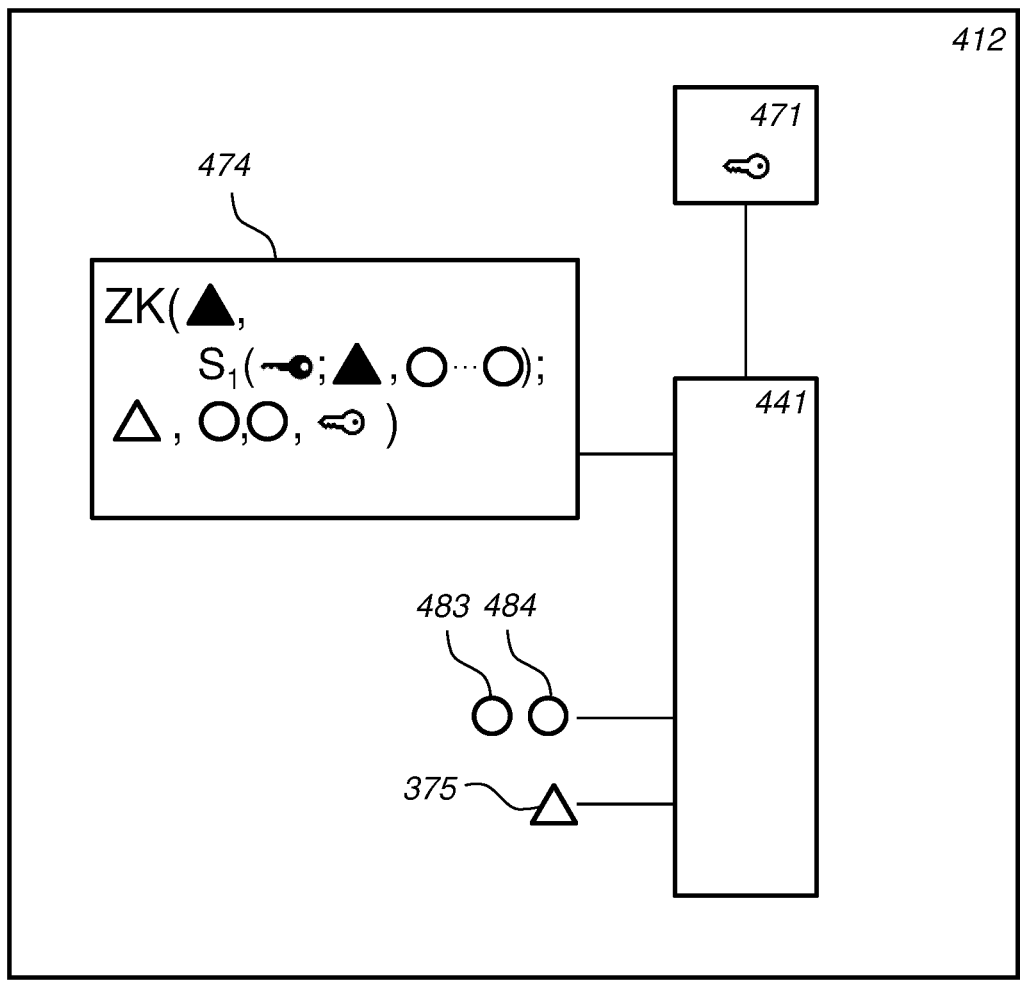
FIG. 4 schematically shows an example of an embodiment of a receiver device.

FIG. 4 schematically shows an example of an embodiment of a receiver device 412 for selectively obtaining attributes of record from a selector device, for example, for use in system 100 of FIG. 1b.

FIG. 4 schematically shows functional units that may be functional units of a processor of receiver device 412 (not shown separately). For example, FIG. 4 may be used as a blueprint of a possible functional organization of the processor. For example, the functional units shown in FIG. 4, e.g., unit 441, may be wholly or partially be implemented in computer instructions that are stored at device 412, e.g., in an electronic memory of device 412, and are executable by a microprocessor of device 412. In hybrid embodiments, functional units are implemented partially in hardware, e.g., as coprocessors, and partially in software stored and executed on device 412. For the purpose of explication, FIG. 4 also shows various elements that may be stored by the device 412 at various stages of its operation.

Shown in the figure is an issuer public key 471 stored in a memory of receiver device 412. Authenticity of the parts of the record may be established with respect to this public key. Shown further are attributes 483, 484 of the record, two in this example. Receiver device 412 may receive this information from a selector device, as discussed elsewhere.

Also shown in the figure is a verification unit 441. Verification unit 441 may perform a zero-knowledge proof with the selector device with respect to the obtained values 483, 484 and the issuer public key 471. Shown here is a non-interactive zero-knowledge proof 474 which verification unit 441 may verify non-interactively, but the proof may also be interactive instead, e.g., with verification unit 441 generating a challenge and providing it to the selector device. The proof may be as discussed, from the perspective of the prover, with respect to selector device 311. Proof 474 may ascertain that the obtained values 483-484 belong to a record of an issuer device corresponding to issuer public key 481. Accordingly, the selector device may prove knowledge of a secret record identifier; a digital signature on a message comprising at least the one or more attributes to be disclosed 483-484 and the secret record identifier, signed with a private key corresponding to the issuer public key 471, signed with a private key corresponding to the issuer public key 471.

Verification of the zero-knowledge proof may be performed corresponding to the zero-knowledge proof system that the selector device uses to prove the statements discussed above. In this particular example, the proof in multiple parts discussed with respect to selector device 311 may be used as described above. For example, receiver device 412 may receive a commitment to the secret identifier from the selector device. The selector device may then prove knowledge, which verification unit 441 verifies, of a secret record identifier and of signatures on attributes 483-484, as discussed above.

Although not explicitly shown in the figure, as also discussed before, the selective disclosure techniques as described herein may be applied to multiple records, possibly from different issuer devices, in which case verification unit 442 may repeat the above procedure for each disclosed record. The receiver device may also provide record queries to the receiver device to influence what records to obtain.

Accordingly, by the various measures discussed above, receiver device 412 may obtain information it needs, e.g., attributes 483, 484 and appropriate authenticity guarantees with respect to public key 471, while not needing access to other sensitive material such as non-disclosed attributes, the secret record identifier or the issuer private key.

Verification unit 441 may further be configured to identify if two or more of the received public record identifiers are repeated. If receiver device 412 receives two de-identified records with the same public record identifiers, which were computed with the same public table key (if any is used) then the corresponding secret record identifiers were also equal. At this point a warning may be generated and/or the operation may be aborted.

After the verifications, researchers may use the disclosed attributes, but they do not gain access to attributes that are not disclosed, e.g., privacy sensitive information, etc.

Below a summary is provided of a particular efficient embodiment. It is noted however, that zero-knowledge protocols could be constructed for other types of signatures as well. In a particular embodiment:

The issuer may have a private key x with public key $y=h^x$. Data may be represented in the form of multiple records, e.g., vectors m comprising attributes $m_i$. For each vector, a signature may be computed by randomly choosing values c, s and $\gamma$; the latter being the secret record identifier. The attribute signature may have the form:

$$\sigma = \left(h_0 \left(\prod_{i \in H} h_i^{m_i}\right) \hat{h}^\gamma \tilde{h}^s\right)^{1/(x+c)}$$

Wherein, H is a set of generators $h_i$ of a group G of prime order q, as is h, $\tilde{h}$ and $\hat{h}$. The signature for a vector m may be represented as a quadruple (c, s, $\gamma$, $\sigma$). The issuer provides the vectors m, the corresponding signatures including the secret record identifier, and the public key y to the selector.

The selector may compute public record identifiers for the vectors m. For example, he may select a private table key a and compute the public table key $K=h^a$ for the table. The public/private table key pair may be unique for this particular table, e.g., this disclosure of data to a recipient device. For each record the selector may now generate a unique public record identifier ID as follows: $ID=e(K, \hat{h}^\gamma)$ The selector forwards some of the attributes to the receiver but not all and the public record identifiers ID. To prove provenance the following protocol may be performed. The selector, e.g., proving unit 342 generates random blinding values $\rho$, t and open, and computes the values mult=$\rho c$, and tmp=open·c. The proving unit 342 constructs the following commitments that may be send to the receiver device:

$C = h_\rho \tilde{h}_{open}$;
$X = \hat{h}^\gamma \cdot \hat{h}'^t$, for generator $\hat{h}$ and randomly generated value t, to secret record identifier $\gamma$;
$A = \sigma \hat{h}^\rho$.

Proving unit 342 now engages the verifier in a zero-knowledge proof of knowledge for the values: c, s, u, $\rho$, t, open, mult, tmp, $m_1, \ldots, m_n$ A first part of the zero-knowledge proof may be used to prove that:

1. $C = h^\rho \tilde{h}^{open} \wedge 1 = C^c h^{-mult} \tilde{h}^{-tmp}$

2. $\dfrac{e\left(h_0 \cdot \prod_{j \in H_1} h_j^{m_j} \cdot X, h\right)}{e(A, y)} =$ $e(A, h)^c \cdot e(\tilde{h}, y)^{-\rho} \cdot e(\tilde{h}, h)^{-mult} \cdot e(\tilde{h}, h)^{-s} \cdot \prod_{j \in H_2} e(h_j, h)^{-m_j} \cdot e(\tilde{h}, h)^t$ 3. $\dfrac{e(h, X)}{ID} = e(K, \hat{h})^{-\gamma} \cdot e(h, \hat{h})^\gamma \cdot e(\tilde{h}, h)^t$ Wherein $H_1$ corresponds to disclosed attributes and $H_2$ to non-disclosed attributes; together $H_1 \cup H_2 = H$. Note that attributes may optionally be encoded as hashes in the proof and/or signatures, etc. The latter is convenient if an attributes can be large. The values y, h, $h_i$, $\tilde{h}$, $\hat{h}$ may be public, and the values ID, A, C, and X are also known to the prover and verifier. The value A is a blinding of the signature, it does not need independent verification, since if f A is blinding is over anything else, the proof does not work. Likewise, it is not needed to separately check X, since it is included on the top of the third proof statement.

Surprisingly, the above proof may be formulated as proving knowledge of a series of exponents that together obtain a known value from known base. This may be proven with a Schnorr protocol. The bilinear map e may e.g., by a so-called Type 1 bilinear map, or a type 3 bilinear map, etc.

This system may be extended with separate signatures for data entries. For example, in an embodiment of system (100) for selectively disclosing attributes, the record comprises multiple data entries. This extension is optional. The processor of the issuer is device may be configured to generate multiple digital signatures on multiple data messages for the multiple data entries using the issuer private key, a data message for a data entry comprising the data entry and the secret record identifier. The digital signatures on the data messages are provided to the selector device. The processor of the selector device may be configured to determine one or more data entries to be disclosed as a subset of the multiple data entries. The zero-knowledge proof of the selector and receiver device proves that the digital signatures on the data messages for the data entries to be disclosed as being digital signatures on messages comprising the data entries to be disclosed and each comprising the secret record identifier, signed with a private key corresponding to the issuer public key. In an embodiment, the processor of the issuer device is configured to generate the digital signature, e.g., $(g^{1/(x+\gamma+H(m))})$, on the data message by computing an exponentiation of a group element (g) to a multiplicative inverse of a value (x+$\gamma$+H(m)), said value being based on at least the issuer private key (x), the secret record identifier ($\gamma$), and the data entry (m). However, other digital signatures may also be used.

Figure 5:
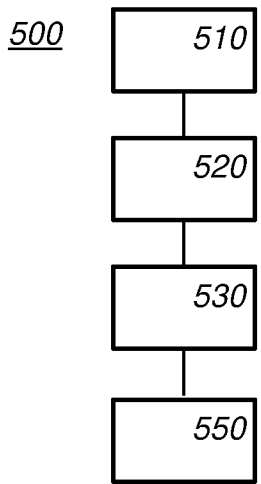
FIG. 5 schematically shows an example of an embodiment of an issuer method.

FIG. 5 schematically shows an example of an embodiment of an issuer method 500 of providing a record to a selector device for selective disclosure. Method 500 is typically computed-implemented.

Issuer method 500 may comprise storing 510 an issuer private key, the issuer private key forming a public-private key pair with a corresponding issuer public key; and the record, the record comprising one or more attributes;

Issuer method 500 may comprise determining 520 a secret record identifier.

Issuer method 500 may comprise generating 530 a digital signature on an attribute message using the issuer private key, the attribute message comprising the one or more attributes and the secret record identifier.

Issuer method 500 may comprise providing 550 the record, the secret record identifier, the digital signature on the attribute message, and the digital signatures on the data messages to the selector device.

Figure 6:
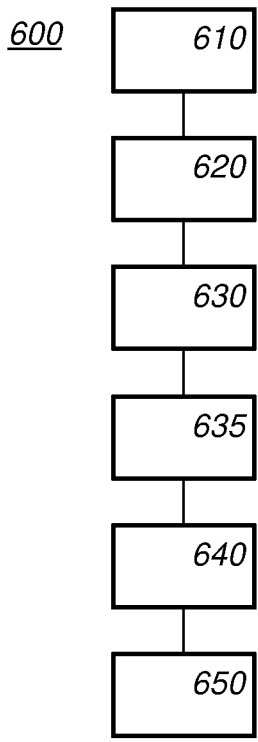
FIG. 6 schematically shows an example of an embodiment of a selector method.

FIG. 6 schematically shows an example of an embodiment of a selector method 600 of selectively disclosing attributes of a record to a receiver device. Method 600 is typically computer-implemented.

Selector method 600 may comprise storing 610 the record, comprising one or more attributes; a secret record identifier; a digital signature on an attribute message generated using an issuer private key, the attribute message comprising the one or more attributes and the secret record identifier; and digital signatures on the data messages generated using the issuer private key, and the secret record identifier.

Selector method 600 may comprise obtaining 620 the record, the secret record identifier, the digital signature on the attribute message and the digital signatures on the data messages.

Selector method 600 may comprise determining 630 one or more attributes to be disclosed as a subset of the one or more attributes.

Selector method 600 may comprise determining 635 a public record identifier from the secret record identifier.

Selector method 600 may comprise providing 640 the one or more attributes to be disclosed to the receiver device.

Selector method 600 may comprise performing 650 a zero-knowledge proof with the receiver device, wherein knowledge is proven of the secret record identifier;

the digital signature on the attribute message as being a digital signature on a message comprising at least the one or more attributes to be disclosed and the secret record identifier, signed with a private key corresponding to the issuer public key.

Figure 7:
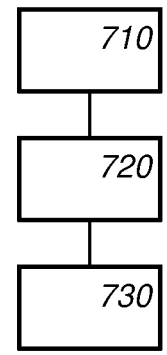
FIG. 7 schematically shows an example of an embodiment of a receiver method.

FIG. 7 schematically shows an example of an embodiment of a receiver method 700 of selectively obtaining attributes of record from a selector device. Method 700 is typically computer-implemented.

Receiver method 700 may comprise storing 710 an issuer public key.

Receiver method 700 may comprise obtaining 720 from the selector device one or more attributes.

Receiver method 700 may comprise performing 730 a zero-knowledge proof with the selector device with respect to the obtained values and the issuer public key to ascertain that the obtained values belong to a record of an issuer device corresponding to the issuer public key, wherein the selector device proves knowledge of:

a secret record identifier;

a digital signature on a message comprising at least the one or more attributes to be disclosed and the secret record identifier, signed with a private key corresponding to the issuer public key.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the methods may be executed using software, which comprises instructions for causing a processor system to perform a method 500, 600, or 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 8:
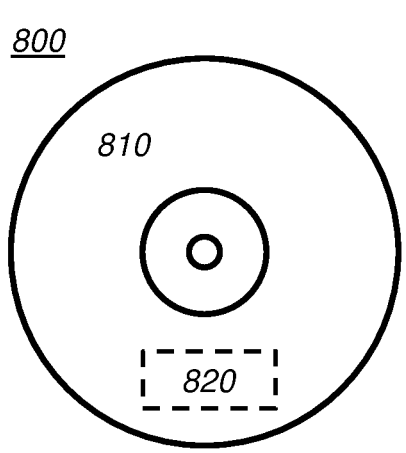
FIG. 8 schematically shows a computer readable medium having a writable part comprising a computer program according to an embodiment, FIG. 9 schematically shows a representation of a processor system according to an embodiment.

FIG. 8 shows a computer readable medium 800 having a writable part 810 comprising a computer program 820, the computer program 820 comprising instructions for causing a processor system to perform an issuer method, a selector method, or a receiver method, according to an embodiment. The computer program 820 may be embodied on the computer readable medium 800 as physical marks or by means of magnetization of the computer readable medium 800. However, any other suitable embodiment is conceivable as well. Furthermore, it will be appreciated that, although the computer readable medium 800 is shown here as an optical disc, the computer readable medium 800 may be any suitable computer readable medium, such as a hard disk, solid state memory, flash memory, etc., and may be non-recordable or recordable. The computer program 820 comprises instructions for causing a processor system to perform one or said methods.

Figure 9:
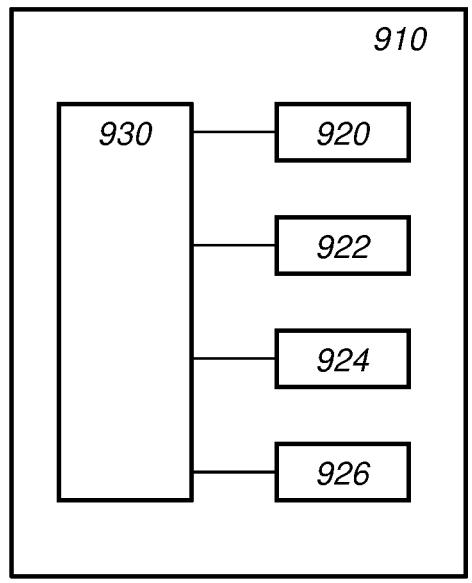

FIG. 9 shows in a schematic representation of a processor system 940 according to an embodiment. The processor system comprises one or more integrated circuits 910. The architecture of the one or more integrated circuits 910 is schematically shown in FIG. 7b. Circuit 910 comprises a processing unit 920, e.g., a CPU, for running computer program components to execute a method according to an embodiment and/or implement its modules or units. Circuit 910 comprises a memory 922 for storing programming code, data, etc. Part of memory 922 may be read-only. Circuit 910 may comprise a communication element 926, e.g., an antenna, connectors or both, and the like. Circuit 910 may comprise a dedicated integrated circuit 924 for performing part or all of the processing defined in the method. Processor 920, memory 922, dedicated IC 924 and communication element 926 may be connected to each other via an interconnect 930, say a bus. The processor system 910 may be arranged for contact and/or contact-less communication, using an antenna and/or connectors, respectively.

For example, in an embodiment, processor system 940, e.g., the issuer device, selector device, or receiver device, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

Typically, the devices each comprise a microprocessor which executes appropriate software stored at the devices; for example, that software may have been downloaded and/or stored in a corresponding memory, e.g., a volatile memory such as RAM or a non-volatile memory such as Flash. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, the issuer device comprises an identifier generation circuit, an attribute signing circuit. In an embodiment, the selector device comprises a selection circuit and a proving circuit. In an embodiment, the receiver device comprises a verification circuit. The devices may comprise additional circuits. The circuits implement the corresponding units described herein. The circuits may be a processor circuit and storage circuit, the processor circuit executing instructions represented electronically in the storage circuits. A processor circuit may be implemented in a distributed fashion, e.g., as multiple sub-processor circuits. Part of the storage may be read-only. The circuits may also be, FPGA, ASIC or the like. A storage may be distributed over multiple distributed sub-storages. Part or all of the memory may be an electronic memory, magnetic memory, etc. For example, the storage may have volatile and a non-volatile part.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A system comprising: an issuer device the issuer device comprising: an issuer memory circuit, wherein the issuer memory circuit is arranged to store an issuer private key and a record, wherein the issuer private key is a portion of a public-private key pair, wherein the record comprises at least one attribute(s); and an issuer processor circuit, wherein the issuer processor circuit is arranged to determine a secret record identifier, wherein the issuer processor circuit is arranged to generate a digital signature using the issuer private key, the at least one attribute(s) and the secret record identifier, wherein the issuer processor circuit is arranged to provide the record, the secret record identifier, and the digital signature to a selector device; the selector device comprising: a selector memory circuit, wherein the selector memory circuit is arranged to store the record, the secret record identifier and the digital signature; and a selector processor circuit, wherein the selector processor circuit is arranged to determine at least one attribute(s), wherein a subset of the at least one attribute(s) is disclosed to a receiver device, wherein the selector processor circuit is arranged to determine a public record identifier from the secret record identifier, wherein the selector processor circuit is arranged to provide the subset of the at least one attributes and the public record identifier to the receiver device, wherein the selector processor circuit is arranged to perform a zero-knowledge proof with the receiver device, wherein the zero-knowledge proof proves knowledge of secret record identifier and the digital signature, wherein the secret record identifier corresponds to the public record identifier; and the receiver device comprising: a receiver memory circuit, wherein the receiver memory circuit is arranged to store the issuer public key; a receiver processor circuit, wherein the receiver processor circuit is arranged to obtain from the selector device the subset of the at least one attributes and the public record identifier; wherein the receiver circuit is arranged perform the zero-knowledge proof with the selector device, wherein the zero-knowledge proof proves knowledge of the subset of the at least one attributes and the issuer public key so as to ascertain that the subset of the at least one attributes belong to the record of the issuer device.

2. The system according to claim 1, wherein the attributes comprise one or more medical attributes.

3. A selector device comprising:
   a selector memory circuit, circuit,
      wherein the selector memory circuit is arranged to store a record, a secret record identifier and the digital signature,
      wherein the record comprises at least one attribute(s),
      wherein the digital signature is generated using the issuer private key, the at least one attribute(s) and the secret record identifier;
   a selector processor circuit,
      wherein the selector processor circuit is arranged to obtain the record, the secret record identifier, and the digital signature,
      wherein the selector processor circuit is arranged to determine subset of the at least one attribute(s),
      wherein the selector processor circuit is arranged to determine a public record identifier from the secret record identifier,
      wherein the selector processor circuit is arranged to provide the subset of the at least one attribute(s) and the public record identifier to a receiver device,
      wherein the selector processor circuit is arranged to perform a zero-knowledge proof with the receiver device,
      wherein the selector device proves knowledge of the secret record identifier and the digital signature,
      wherein the secret record identifier corresponds to the public record identifier.

4. The selector device according to claim 3,
   wherein the selector memory circuit is arranged to store multiple records,
   wherein each of the multiple records comprises at least one attribute(s),
   wherein the selector processor circuit is arranged to choose selected records,
   wherein the selected records are at least one record selected from the multiple records,
   wherein the selector processor circuit is arranged to provide the subset of the at least one attributes and the public record identifier to the receiver device for each of the selected records, wherein the selector processor circuit is arranged to perform the zero-knowledge proof with the receiver device for each of the selected records.

5. The selector device according to claim 3,
wherein the selector processor circuit is arranged to obtain a record query,
wherein the selector processor circuit is arranged to select at least one the multiple records based to the record query.

6. The selector device according to claim 5,
wherein the selector processor circuit is arranged to perform the zero-knowledge proof with the receiver device for a first record of the at least of the selected records,
wherein the zero-knowledge proof proves that the current record satisfies the record query.

7. The selector device according to claim 6,
wherein the selector processor circuit is arranged to generate a public table key,
wherein the public record identifier is determined from the secret record identifier and the public table key,
wherein the public table key is provided to the receiver device.

8. The selector device according to claim 6,
wherein performing the zero-knowledge proof comprises providing a commitment of the secret record identifier to the receiver device,
wherein performing the zero-knowledge proof comprises proving knowledge of the digital signatures with respect to the commitment.

9. A receiver device comprising: a receiver memory circuit, wherein the receiver memory circuit is arranged to store an issuer public key; and a receiver processor circuit, wherein the receiver processor circuit is arranged to obtain from a selector device at least one attribute(s) and a public record identifier, wherein a subset of the at least one attribute(s) is disclosed to a receiver device, wherein the receiver processor circuit is arranged to perform a zero-knowledge proof with the selector device, wherein the zero-knowledge proof proves knowledge of the subset of the at least one attributes and the issuer public key so as to ascertain that the subset of the at least one attributes belong to a record of an issuer device, wherein the issuer device corresponds to the issuer public key, wherein the zero-knowledge proof proves knowledge of a secret record identifier, wherein the secret record identifier corresponds to the public record identifier, wherein the zero-knowledge proof proves a digital signature, wherein the digital signature is over the subset of the at least one attribute(s) and the secret record identifier, wherein the digital signature uses a private key, wherein the private key corresponds to the issuer public key.

10. The receiver device according to claim 9,
wherein the receiver processor circuit is arranged to the is arranged to perform the zero-knowledge proof by obtaining a non-interactive zero-knowledge proof from the selector device,
wherein the receiver processor circuit is arranged to verify the non-interactive zero-knowledge proof.

11. The receiver device according to claim 9
wherein the receiver processor circuit is arranged to obtain multiple records,
wherein the receiver processor circuit is arranged to perform a zero-knowledge proof with the selector device for each of the multiple records.

12. The receiver device according to claim 11,
Wherein each of the multiple records are associated with a public record identifier,
wherein the receiver processor circuit is arranged to identify if at least two of the public record identifiers are repeated.

13. A selector method comprising: storing a record, a secret record identifier and the digital signature, wherein the record comprises at least one attribute(s), wherein the digital signature is generated using the issuer private key, the at least one attribute(s) and the secret record identifier; obtaining the record, the secret record identifier, and the digital signature; determining a subset of the at least one attribute(s); determining a public record identifier from the secret record identifier; providing the subset to a receiver device; and performing a zero-knowledge proof with the receiver device, wherein knowledge is proven of the secret record identifier and the digital signature, wherein the secret record identifier corresponds to the public record identifier.

14. A receiver method comprising: storing an issuer public key; obtaining from a selector device at least one attribute(s) and a public record identifier; performing a zero-knowledge proof with the selector device, wherein the zero-knowledge proof proves knowledge of the subset of the at least one attributes and the issuer public key so as to ascertain that the subset of the at least one attributes belong to a record of an issuer device, wherein the issuer device corresponds to the issuer public key, wherein the zero-knowledge proof proves knowledge of a secret record identifier, wherein the secret record identifier corresponds to the public record identifier, wherein the zero-knowledge proof proves a digital signature, wherein the digital signature is over the subset of the at least one attribute(s) and the secret record identifier, wherein the private key corresponds to the issuer public key.

15. A computer program stored on a non-transitory medium, wherein the computer program when executed on a processor performs the method as claimed in claim 13.

16. A computer program stored on a non-transitory medium, wherein the computer program when executed on a processor performs the method as claimed in claim 14.

* * * * *